United States Patent [19]

Bernotavicz

[11] 3,985,904

[45] Oct. 12, 1976

[54] SHELF STABLE, HIGH MOISTURE, MEAT-CONTAINING FOOD PRODUCT

[75] Inventor: John W. Bernotavicz, Barrington, Ill.

[73] Assignee: The Quaker Oats Company, Chicago, Ill.

[22] Filed: Mar. 25, 1974

[21] Appl. No.: 454,212

[52] U.S. Cl. .................. 426/332; 426/541; 426/643; 426/644; 426/645; 426/805; 426/532

[51] Int. Cl.[2] ...................... A23K 1/10; A23L 1/31

[58] Field of Search ........... 426/151, 332, 335, 212, 426/224, 371, 376, 382, 205

[56] References Cited

UNITED STATES PATENTS

| | | | |
|---|---|---|---|
| 2,933,399 | 4/1960 | Nickerson et al. | 426/151 X |
| 3,653,908 | 4/1972 | Buck et al. | 426/151 |
| 3,694,233 | 9/1972 | Kaplow et al. | 426/589 |
| 3,852,486 | 12/1974 | Walker et al. | 426/332 X |
| 3,865,955 | 2/1975 | Friedman et al. | 426/205 X |

*Primary Examiner*—Jeanette M. Hunter
*Attorney, Agent, or Firm*—Mathew R. P. Perrone, Jr.; Donnie Rudd

[57] ABSTRACT

A shelf stable, high moisture, meat-containing food product is disclosed. The food product has a major portion thereof of cooked, proteinaceous meaty material and also includes an edible, non-toxic acid and an effective amount of antimycotic. It may also include a starchy filler material and an effective amount of antioxidant.

27 Claims, No Drawings

SHELF STABLE, HIGH MOISTURE, MEAT-CONTAINING FOOD PRODUCT

BACKGROUND OF THE INVENTION

1. FIELD OF THE INVENTION

This invention relates to a shelf stable, high moisture, meat-containing food product. The food product has a moisture content greater than about 50 percent by weight and is stable against mold and bacterial growth. It is highly desirable both as a human food and as a pet food.

DESCRIPTION OF THE PRIOR ART

With the exception of mince meat-like products and "jerky" type products, shelf stable meat-containing or meat-like foods have been unavailable. These products, however, have utilized either a high sugar content or a low moisture content to preserve the meat. A high moisture content meaty human food with shelf stability has been heretofore unknown.

Pet foods generally fall into three classes. The low moisture containing animal foods, that is, animal foods containing less than about 15 percent by weight moisture are known as the dry pet foods and are stable because the water activity therein does not lend itself to mold and bacterial growth. These products need not be aseptically canned or preserved since they are stable by their chemical characteristics.

The high moisture containing pet foods, namely those in the order of about 85 percent by weight moisture, require aseptic canning for preservation. These are the well known canned pet foods.

In recent years the pet food industry has moved toward the very popular semi-moist or intermediate moisture pet foods. These pet foods are intermediate in moisture having a moisture content of from about 20 to about 40 percent by weight. While this moisture content would normally render the product susceptable to mold and bacterial growth, these products have been rendered stable by inclusion of various acids and solutes thereby altering the pH and also decreasing the water activity, $A_w$, to a level which makes mold and bacterial growth virtually impossible. Beginning with the Burgess patent, U.S. Pat. No. 3,202,514, the pet food industry has developed a multitude of methods for making semi-moist food products and rendering them stable against mold and bacterial growth. Generally, however, these products have always utilized a pH control and solute content in order to provide a critical acidity and water activity and thereby discourage mold and bacterial growth. To this date, however, no one has successfully developed a high moisture containing animal food, that is, an animal food with a moisture content above about 50 percent by weight, which is also stable against mold and bacterial growth. Also, no one has, prior to this invention, developed an animal food product which has a water activity in the order of above about 0.90 but which is still stable against mold and bacterial growth. This invention accomplishes this result and provides the long felt need for a high moisture, meat-containing, shelf stable, animal food product.

SUMMARY OF THE INVENTION

It is an object of this invention to provide a shelf stable, high moisture, meat-containing food product.

It is another object of this invention to provide a food product having a moisture content above about 50 percent by weight and yet being stable against mold and bacterial growth.

It is a further object of this invention to provide a food product having a water activity, $A_w$, above about 0.90 and yet being stable against mold and bacterial growth.

It is still a further object of this invention to provide a food product comprising predominantly cooked, proteinaceous, meaty material and yet being shelf stable, i.e. stable against mold and bacterial growth.

It is a further object of this invention to provide a process for producing a food product in accordance with the above objectives.

The objects of this invention are accomplished by a shelf stable, high moisture, meat-containing food product having a moisture content of at least about 50 percent by weight and having a water activity, $A_w$, of at least about 0.90, said food comprising cooked proteinaceous meaty material, acidified with from about 1.7 percent to about 3.8 percent by weight edible non-toxic acid sufficient to cause the food product to have a pH of from about 3.9 to about 5.5; and an effective amount of antimycotic.

The objects of this invention are further accomplished by a shelf stable, high moisture, meat-containing food having a moisture content of at least about 50 percent by weight and having a water acitivity, $A_w$, of at least about 0.90, said food comprising greater than 50 percent by weight cooked proteinaceous meaty material; from about 1 percent to about 35 percent by weight gelatinized starchy filler material with the total amount of cooked proteinaceous meaty material plus starchy filler material comprising greater than about 85 percent by weight of the food; from about 1.7 percent to about 3.8 percent by weight edible, non-toxic acid sufficient to cause the food product to have a pH of from about 3.9 to about 5.5; and an effective amount of antimycotic.

In a preferred embodiment of this invention, the food product as described above also includes from about 2 to about 4 percent by weight edible fat and oil.

In still another preferred embodiment of this invention, the above-described food product includes from about 0.1 to about 3 percent by weight emulsifier.

Preferably, the objects of this invention are accomplished by a shelf stable, high moisture meat-containing food having a water content of at least about 50 percent by weight and having a water activity, $A_w$, of at least about 0.90, said food comprising greater than about 90 percent by weight cooked proteinaceous meaty material, from 1 percent to 5 percent by weight gelatinized starchy material, from about 1.7 percent to about 3.8 percent by weight edible, non-toxic acid sufficient to cause the food product to have a pH of from about 3.9 to about 5.5, and an effective amount of antimycotic.

In still another preferred embodiment of this invention, the above-described food product also includes from about 2 to about 4 percent by weight edible fat or oil and may also include preferably from about 0.1 to about 3 percent by weight emulsifier.

When a liver-like food product is desirable, the objects of this invention are accomplished by a shelf stable, high moisture containing, liver-like food having a water content at least about 50 percent by weight and having a water activity, $A_w$, of at least about 0.90, said liver-like food comprising about 90 percent by weight cooked pork or beef liver, about 4 percent by weight edible fat or oil, about 3 percent by weight gelatinized starch, about 2 percent by weight edible acid, and an effective amount of antioxidant and antimycotic.

More preferably, when a liver-like food product is preferred, the objects of this invention are accomplished by a shelf stable, high moisture, meat-containing food having a water content of at least about 50 percent by weight and having a water activity, $A_w$, of at least about 0.90, said food comprising from 85 to 95 percent by weight cooked pork or beef liver, from 0–6 percent by weight edible fat or oil, from 2–5 percent by weight gelatinized starch material, from about 1.7 to 3.8 percent by weight edible non-toxic acid in order to provide a pH of from about 3.9 to 5.5, and an effective amount of antioxidant and antimycotic.

When a chicken-based food product is desired, the objects of this invention are accomplished by a shelf stable, high moisture containing, chicken-based food product having a water content of at least about 50 percent by weight and having a water activity, $A_w$, of at least about 0.90, said food product comprising from about 85 percent to 95 percent by weight cooked chicken parts, from about 1 to 6 percent by weight edible fat or oil, from about 2 to 6 percent by weight gelatinized starch material, from about 1.7 to 3.0 percent by weight edible non-toxic acid in order to give a pH of from about 3.9 to 5.5, and an effective amount of antioxidant and antimycotic.

When a fish-like food product is desired, the objects of this invention are accomplished by a shelf stable, high moisture containing fish based food product having a water content of at least about 50 percent by weight and a water activity, $A_w$, of at least about 0.90, said food product comprising from about 85 to 95 percent by weight cooked fish, from about 1 to 6 percent by weight edible fat or oil, from about 2 to 5 percent by weight gelatinized starch materials, from about 1.7 to 3.8 percent by weight edible non-toxic acid in order to provide a pH of from about 3.9 to 5.5, and an effective amount of antioxidant and antimycotic.

Preferably, the process of this invention consists of a process for producing a shelf stable, high moisture, meat-containing food product, said process comprising: cooking a proteinaceous meaty material; admixing the cooked proteinaceous meaty material with an edible, non-toxic acid and an effective amount of antimycotic; said edible, non-toxic acid being provided in an amount of from about 1.7 percent to about 3.8 percent by weight and being sufficient to cause the food product to have a pH of from about 3.9 to about 5.5; and thereafter forming the mixture into the shape of a food product.

The objects of this invention can also be accomplished by a process for producing a shelf stable, high moisture, meat-containing food product, said process comprising: admixing a proteinaceous meaty material with an edible non-toxic acid and an effective amount of antimycotic; said edible, non-toxic acid being provided in an amount of from about 1.7 percent to about 3.7 percent by weight and sufficient to cause the food product to have a pH of from about 3.9 to about 5.5; and thereafter cooking the mixture and forming it into the shape of a food product.

In each of the above-described processes, it may be preferable to include in the mixture from about 2 to about 4 percent by weight edible fat or oil, and from about 0.1 to about 3 percent by weight emulsifier.

If a liver-like food product is desired, the objects of this invention are accomplished preferably by a process for producing a shelf stable, high moisture containing liver-like food product, said process comprising: cooking pork or beef liver; admixing the liver with a gelatinized starchy material, an edible non-toxic acid, and effective amount of antioxidant and antimycotic in amounts sufficient to provide from about 85 to 95 percent by weight cooked pork or beef liver, from 0–6 percent by weight edible fat or oil, from about 2–5 percent by weight gelatinized starchy material, and from about 1.7 to 3 percent by weight edible non-toxic acid in order to provide a pH of from about 3.9 to 5.5; and thereafter forming the mixture into the shape of a food product.

If a chicken-based food product is desired, the objects of this invention are accomplished preferably by a process for producing a shelf stable, high moisture containing chicken-based food product, said process comprising: cooking a mixture of chicken parts; admixing the cooked chicken parts with a gelatinized starchy filler material, an edible non-toxic acid, and an effective amount of antioxidant and antimycotic in amounts sufficient to provide from about 85–95 percent by weight cooked chicken parts, from about 2–5 percent by weight gelatinized starchy filler material, and from about 1.7 to 3.8 percent by weight edible non-toxic acid in order to provide a pH of from about 3.9 to 5.5; and thereafter forming the mixture into the shape of a food product.

If a fish-based food product is desired, the objects of this invention are preferably accomplished by a process for producing a shelf stable, high moisture containing fish-based food product, said process comprising: cooking fish; admixing the cooked fish with a gelatinized starchy filler material, an edible non-toxic acid, and an effective amount of antioxidant and antimycotic in amounts sufficient to provide from about 85–95 percent by weight cooked fish, from about 2–5 percent by weight gelatinized starchy filler material, from about 1.7 to 3.8 percent by weight edible non-toxic acid in order to provide a pH of from about 3.9 to 5.5; and thereafter forming the mixture into the shape of a food product.

This invention provides for a food product having a moisture content of at least about 50 percent by weight. It is not desirable to go substantially below about 50 percent by weight moisture content, that is, to go as low as about 45 percent by weight moisture content, in order to provide a food product in accordance with this invention.

This invention provides a food product which preferably has a proteinaceous meaty material content of about 90 percent by weight. In other words, while it is acceptable to provide lower proteinaceous meaty contents, it is highly desirable to produce the product having a substantial portion, that is, about 90 percent by weight proteinaceous, meaty material in order to be acceptable. Also, if the food product contains the higher amounts of proteinaceous meaty material, it is more nutritious.

In addition, the food product provided by this invention has a water activity, $A_w$, of at least about 0.90. The term "Water activity, $A_w$," is well known within the semi-moist or intermediate moisture animal food industry, and the water activity of this product is generally higher than any of the known dry, semi-moist, or intermediate moisture products.

Generally, the shelf stable, high moisture containing food products of this invention have a water content above about 50 percent by weight, have a protein content in the order of about 25 percent, and a fat content somewhere around 10–15 percent by weight, although these amounts may vary as the desired product ingredients are changed to effect the desired nutritional and/or feeding characteristics.

The food product of this invention preferably but not necessarily includes a proteinaceous meaty material which has been precooked. In other words, the proteinaceous meaty material may be cooked prior to inclusion in the process. In other words, it is preferred that the meaty material be cooked prior to admixing with the substantial portion of the other materials.

The term "proteinaceous, meaty material" refers to the group consisting of meat, meat by-products, and meat meal, as well as mixtures of these. The term "meat" is understood to apply not only to the flash of cattle, swine, sheep and goats, but also to horses, whales and other mammals, as well as poultry and fish. The term "meat by-products" is intended to refer to those nonrendered parts of the carcass of slaughtered animals including but not restricted to mammals, poultry and the like, and including such constituents as are embraced by the term "meat by-products" in the definitions of feed ingredients published by the Association of Feed Control Officials, Inc. Likewise, the term "meat meal" refers to the finely ground dry rendered residue from animal tissues including those dried residues embraced by the term in the aforesaid official definition of the Association of American Feed Control Officials, Inc. The terms "meat", "meat by-products", and "meat meal" are understood to apply to all of those animal, poultry and marine products defined by said association.

The food product of this invention may also include appropriate amounts of gelatinized starchy filler material. The starchy filler material may include starchy flours or other such material from oil seeds or legumes and includes such things as corn flour, and wheat flour. It includes the oil expressed or extracted meals and cakes of the various oil seeds and legume products. The starchy material used herein must be substantially gelatinized and by "gelatinization" it is taken to mean the term with the well accorded definition within the cereal industry. Together, the starchy filler material and precooked proteinaceous meaty material preferably comprise at least about 85 percent by weight of the food product. If about 90 percent by weight of the animal food product is a proteinaceous meaty material, then it is preferred not to supply more than about 2 to about 5 percent by weight of starchy filler material. If the minimum preferred amount of proteinaceous meaty material is included, that is, if only slightly greater than about 50 percent by weight precooked proteinaceous meaty material is used, then it is preferred to use up to about 35 percent by weight of the gelatinized starchy material in order that the combination of starchy filler material and precooked proteinaceous meaty material total a minimum of about 85 percent by weight of the total food product. The amount and ratio of proteinaceous meaty material and gelatinized, starchy, filler material may be adjusted depending upon the desired texture characteristics as well as the desired nutritional characteristics. In other words, if one desires higher proteinaceous content, then more proteinaceous meaty material is used. The higher the starch content, the firmer the product and the more that it will set to give a firm dough-like end product.

The food product of this invention also must include from about 1.7 percent to about 3.8 percent by weight of an edible, non-toxic acid sufficient to cause the food product to have a pH from about 3.9 to about 5.5. The edible, non-toxic acid of this invention includes those edible, non-toxic acids commonly used in semi-moist or intermediate moisture food industry. In other words, the edible, non-toxic acid includes such acids as hydrochloric acid, phosphoric acid, citric acid, tartaric acid, gluconic acid, fumaric acid, maleic acid, glutaric acid, lactic acid, succinic acid, adipic acid, palmitic acid, acetic acid, and propionic acid, although other edible, non-toxic acids generally known to the intermediate moisture food industry may be acceptable for use in this invention.

This invention preferably also includes the utilization of effective amounts of an antioxidant. The antioxidants normally used in the semi-moist or intermediate moisture food industry may be utilized in this invention. Ethoxyquin is of particularly good use in this invention. Other known edible non-toxic antioxidants may also be used in the place of ethoxyquin. Another particularly good antioxidant is sold under the trademark Tenox 6 and consists of 10 percent BHA, 10 percent BHT, 6 percent propyl gallate, 6 percent citric acid, 12 percent propylene glycol, 28 percent corn oil, and 28 percent by weight glycerol mono-oleate. The amount of antioxidant is an amount sufficient to effect the desired antioxidant properties in the product. Generally, this amount is limited by governmental regulation of inclusion in the product but could, if allowed, go up to about 1 percent by weight of the total product. Generally this amount is much lower, and in the case of ethoxyquin constitutes about 0.2 percent by weight of the total product. It is only in certain cases of rancidity that the antioxidant is used and it need not be used in every embodiment of this invention.

This invention also must include the use of an effective amount of antimycotic. The antimycotics well known in the semi-moist or intermediate moisture food industry may be used. For instance, the product may include edible benzoates or propionates as well as the sorbate salts. Of particular importance in this invention are the use of sodium benzoate, calcium propionate and potassium sorbate. Again, the amount of antimycotic is an amount sufficient to prevent mold and bacterial growth within the product. Generally this amount is limited by governmental regulation on the particular antimycotic used. The total amount of antimycotic should never exceed about 1 percent by weight of the total product and in the case of a combination of sodium benzoate and calcium propionate each may be applied in an amount, say, of about ⅛ of 1 percent by weight of the total product.

It may be desirable also to include within this product about 2 to about 4 percent by weight edible fat or oil which may include animal fats and oils as well as vegetable fats and oils. The animal fats used herein are the general animal derived fatty materials such as choice white grease, but may also include other fats and tallows generally acceptable for inclusion in food products. When fat or oil is included, it must be balanced with the starch in order to provide the appropriate texture desired. Higher fat contents are used for softer products and for products that may be pumped or have a paté-like characteristic. Again, a higher starch-to-fat ratio is used when a firmer product is desired.

In some aspects of this invention it may also be desirable to include an emulsifier in the product. In such cases an emulsifier is used in order to effect pumping or spreadability of the product. Of particular use in this invention are emulsifiers having a HLB ratio of from about 1 to about 5 and consisting of mixtures of monoglycerides and diglycerides of fat forming fatty acids. One such emulsifier commercially available is marketed as Atmos 300 and is a light amber clear liquid at 75°F. with from 47–50 percent alpha monoglycerides and from 54–59 percent total monoglycerides. The product has an HLB ratio of 2.8±1, an iodine value of 74–78, is insoluble in water at 75°F. and soluble in cottonseed oil at 75°F. Other emulsifiers having similar emulsification properties are likewise useful in this invention.

The process of this invention, although simple, is highly unique in providing a new and novel food product. The process preferably comprises first cooking a proteinaceous, meaty material as hereinbefore described. After the proteinaceous, meaty material is cooked, it is then admixed with the other ingredients hereinbefore described in the amounts hereinbefore described, and thereafter formed into the shape of a food product. By use of the term "cooking" with reference to the proteinaceous meaty material, it is simply meant that the proteinaceous, meaty material is substantially cooked as one would normally regard cooking in the food industry. While the cooking is preferred prior to mixing, mixing may occur first followed by cooking of the mixture. If the proteinaceous meaty material is frozen, then it may be crushed and ground in well known devices and then cooked in some such thing as a pressure cooker before inclusion in the product. The end result is a moldable, plastic, non-sticky food product which may have the texture characteristics that one desires depending upon the amount of ingredients within the claimed limitations.

DESCRIPTION OF THE PREFERRED EMBODIMENTS

EXAMPLE 1

A quantity of beef liver was crushed and cooked in a pressure cooker. The beef liver was admixed with other ingredients to give the following formula:

| Ingredients | Parts by Weight |
|---|---|
| Beef liver | 90.00 |
| Choice white grease (animal fat) | 4.0 |
| Gelatinized corn flour | 3.0 |
| Adipic acid | 2.0 |
| Emulsifier (Atmos 300) | 0.5 |
| Ethoxyquin | 0.2 |
| Sodium benzoate | 0.125 |
| Calcium propionate | 0.125 |
| Additional Antioxidant (Tenox 6) | 0.05 |

The cooked beef liver was admixed with the other ingredients in the proportions above shown and the product was subdivided into small bits and made a highly nutritious and acceptable cat food. The product had a moisture content of approximately 53 percent, a protein content above 25 percent, and a fat content of approximately 13 percent by weight. The pH of the product was approximately 4.45.

EXAMPLE 2

A quantity of pork liver was crushed and cooked in a pressure cooker. The pork liver was mixed with other ingredients to give a formula having the following composition:

| Ingredients | Parts by Weight |
|---|---|
| Pork liver | 90.00 |
| Animal fat (choice white grease) | 4.0 |
| Pregelatinized corn flour | 3.0 |
| Adipic acid | 2.0 |
| Emulsifier (Atmos 300) | 0.5 |
| Ethoxyquin | 0.2 |
| Sodium benzoate | 0.125 |
| Calcium propionate | 0.125 |
| Additional antioxidant (Tenox 6) | 0.05 |

The cooked liver was admixed with the other ingredients in the proportions above shown and the product was cast in a tube such as a toothpaste tube. The product, without aseptic canning, could be squeezed out to produce a liver pate type product which had good flavor and was highly acceptable to cats and which was shelf stable against bacteriological and mold contamination.

EXAMPLE 3

A quantity of pork liver was crushed and cooked in a pressure cooker. The pork liver was mixed with other ingredients to give a formula having the following composition:

| Ingredients | Parts by Weight |
|---|---|
| Pork liver | 90.00 |
| Animal fat (choice white grease) | 4.0 |
| Pregelatinized corn flour | 3.0 |
| Succinic acid | 2.25 |
| Emulsifier (Atmos 300) | 0.5 |
| Ethoxyquin | 0.2 |
| Sodium benzoate | 0.125 |
| Calcium propionate | 0.125 |
| Additional antioxidant (Tenox 6) | 0.05 |

The cooked liver was admixed with the other ingredients in the proportions above shown and the product was cast in a tube such as a toothpaste tube. The product, without aseptic canning, could be squeezed out to produce a liver pate type product which had good flavor and was highly acceptable to cats and which was shelf stable against bacteriological and mold contamination. The water activity of this product was found to be 0.98 and the pH of the product was found to be about 4.3.

EXAMPLE 4

A quantity of pork liver was crushed and cooked in a pressure cooker. The pork liver was mixed with other ingredients to give a formula having the following composition:

| Ingredients | Parts by Weight |
|---|---|
| Pork liver | 90.00 |

| Ingredients | Parts by Weight |
| --- | --- |
| Animal fat (choice white grease) | 4.0 |
| Pregelatinized corn flour | 3.0 |
| Fumuric acid | 2.0 |
| Emulsifier (Atmos 300) | 0.5 |
| Ethoxyquin | 0.2 |
| Sodium benzoate | 0.125 |
| Calcium propionate | 0.125 |
| Additional antioxidant (Tenox 6) | 0.05 |

The cooked liver was admixed with the other ingredients in the proportions above shown and the product was cast in a tube such as a toothpaste tube. The product, without aseptic canning, could be squeezed out to produce a liver pate type product which had good flavor and was highly acceptable to cats and which was shelf stable against bacteriological and mold contamination. The water activity, $A_w$, of this product was found to be 0.98 and the pH of the product was found to be about 4.0.

EXAMPLE 5

A quantity of pork liver was crushed and cooked in a pressure cooker. The pork liver was mixed with other ingredients to give a formula having the following composition:

| Ingredients | Parts By Weight |
| --- | --- |
| Pork liver | 90.00 |
| Animal fat (choice white grease) | 4.0 |
| Pregelatinized corn flour | 3.0 |
| Citric acid | 2.50 |
| Emulsifier (Atmos 300) | 0.5 |
| Ethoxyquin | 0.2 |
| Sodium benzoate | 0.125 |
| Calcium propionate | 0.125 |
| Additional antioxidant (Tenox 6) | 0.05 |

The cooked liver was admixed with the other ingredients in the proportions above shown and the product was cast in a tube such as a toothpaste tube. The product, without aseptic canning, could be squeezed out to produce a liver pate type product which had good flavor and was highly acceptable to cats and which was shelf stable against bacteriological and mold contamination. The water activity, $A_w$, of this product was found to be 0.98 and the pH of the product was found to be about 3.5.

EXAMPLE 6

A quantity of pork liver was crushed and cooked in a pressure cooker. The pork liver was mixed with other ingredients to give a formula having the following composition:

| Ingredients | Parts by Weight |
| --- | --- |
| Pork liver | 90.00 |
| Animal fat (choice white grease) | 4.0 |
| Pregelatinized corn flour | 3.0 |
| Tartaric acid | 2.50 |
| Emulsifier (Atmos 300) | 0.5 |
| Ethoxyquin | 0.2 |
| Sodium benzoate | 0.125 |
| Calcium propionate | 0.125 |
| Additional antioxidant (Tenox 6) | 0.05 |

The cooked liver was admixed with the other ingredients in the proportions above shown and the product was cast in a tube such as a toothpaste tube. The product, without aseptic canning, could be squeezed out to produce a liver pate type product which had good flavor and was highly acceptable to cats and which was shelf stable against bacteriological and mold contamination. The water activity, $A_w$, of this product was found to be 0.98 and the pH was found to be about 3.5.

EXAMPLE 7

A quantity of pork liver was crushed and cooked in a pressure cooker. The pork liver was mixed with other ingredients to give a formula having the following composition:

| Ingredients | Parts By Weight |
| --- | --- |
| Pork liver | 90.00 |
| Animal fat (choice white grease) | 4.0 |
| Pregelatinized corn flour | 3.0 |
| Acetic acid | 1.75 |
| Emulsifier (Atmos 300) | 0.5 |
| Ethoxyquin | 0.2 |
| Sodium benzoate | 0.125 |
| Calcium propionate | 0.125 |
| Additional antioxidant (Tenox 6) | 0.05 |

The cooked liver was admixed with the other ingredients in the proportions above shown and the product was cast in a tube such as a toothpaste tube. The product, without aseptic canning, could be squeezed out to produce a liver pate type product which had good flavor and was highly acceptable to cats and which was shelf stable against bacteriological and mold contamination. The water activity, $A_w$, of this product was found to be approximately 0.97 and the pH was found to be about 4.96.

EXAMPLE 8

A quantity of pork liver was crushed and cooked in a pressure cooker. The pork liver was mixed with other ingredients to give a formula having the following composition:

| Ingredients | Parts By Weight |
| --- | --- |
| Pork liver | 90.00 |
| Animal fat (choice white grease) | 4.0 |
| Pregelatinized corn flour | 3.0 |
| Hydrochloric acid | 2.0 |
| Emulsifier (Atmos 300) | 0.5 |
| Ethoxyquin | 0.2 |
| Sodium benzoate | 0.125 |
| Calcium propionate | 0.125 |
| Additional antioxidant (Tenox 6) | 0.05 |

The cooked liver was admixed with the other ingredients in the proportions above shown and the product was cast in a tube such as a toothpaste tube. The product, without aseptic canning, could be squeezed out to produce a liver pate type product which had good flavor and was highly acceptable to cats and which was shelf stable against bacteriological and mold contamination. The water activity, $A_w$, of this product was found to be 0.97 and the pH was found to be 4.13.

EXAMPLE 9

A quantity of pork liver was crushed and cooked in a pressure cooker. The pork liver was mixed with other ingredients to give a formula having the following composition:

| Ingredients | Parts by Weight |
| --- | --- |
| Pork liver | 90.00 |
| Animal fat (choice white grease) | 4.0 |
| Pregelatinized corn flour | 3.0 |
| Phosphoric acid | 2.0 |
| Emulsifier (Atmos 300) | 0.5 |
| Ethoxyquin | 0.2 |
| Sodium benzoate | 0.125 |
| Calcium propionate | 0.125 |
| Additional antioxidant (Tenox 6) | 0.05 |

The cooked liver was admixed with the other ingredients in the proportions above shown and the product was cast in a tube such as a toothpaste tube. The product, without aseptic canning, could be squeezed out to produce a liver pate type product which had good flavor and was highly acceptable to cats and which was shelf stable against bacteriological and mold contamination. The water activity of this product was found to be about 0.98 and the pH was found to be about 4.2.

EXAMPLE 10

Pork liver was crushed and cooked in a pressure cooker. The pork liver was admixed with other ingredients to give the following composition:

| Ingredients | Parts by Weight |
| --- | --- |
| Pork liver | 95.00 |
| Phosphoric acid | 2.25 |
| Ethoxyquin | 0.20 |
| Sodium benzoate | 0.10 |
| Calcium propionate | 0.125 |
| Antioxidant (Tenox 6) | 0.05 |
| Gelatinized corn starch | 1.275 |

The cooked pork liver was admixed with the other ingredients and the product cast into small particles. The product had a water activity, $A_w$, of about 0.99, was shelf stable and was highly acceptable to cats.

EXAMPLE 11

A fish base was prepared comprising a mixture of equal parts of skipjack tuna, flounder and shrimp. The fish parts were thoroughly mixed together and cooked in a pressure cooker. The cooked fish was then admixed with other ingredients in amounts as follows:

| Ingredients | Parts By Weight |
| --- | --- |
| Fish | 90.00 |
| Adipic acid | 2.75 |
| Gelatinized corn flour | 3.125 |
| Animal fat (choice white grease) | 3.00 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked fish and the product cast into small particles. The product was found to have a pH of 5.0 and a water activity, $A_w$, of about 0.99. The product was highly acceptable to cats and had shelf stability against mold and bacterial growth.

EXAMPLE 12

A fish base was prepared comprising a mixture of equal parts of skipjack tuna, flounder and shrimp. The fish parts were thoroughly mixed together and cooked in a pressure cooker. The cooked fish was then admixed with other ingredients in amounts as follows:

| Ingredients | Parts By Weight |
| --- | --- |
| Fish | 90.00 |
| Succinic acid | 2.85 |
| Gelatinized corn flour | 3.475 |
| Animal fat (choice white grease) | 2.40 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked fish and the product cast into small particles. The product was found to have a pH of 4.53 and a water activity, $A_w$, of about 0.99. The product was highly acceptable to cats and had shelf stability against mold and bacterial growth.

EXAMPLE 13

A fish base was prepared comprising a mixture of equal parts of skipjack tuna, flounder and shrimp. The fish parts were thoroughly mixed together and cooked in a pressure cooker. The cooked fish was then admixed with other ingredients in amounts as follows:

| Ingredients | Parts By Weight |
| --- | --- |
| Fish | 90.00 |
| Fumaric acid | 2.75 |
| Gelatinized corn flour | 3.125 |
| Animal fat (choice white grease) | 3.00 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked fish and the product cast into small particles. The product was found to have a pH of 4.27 and a water activity, $A_w$, of 0.99. The product was highly acceptable to cats and had shelf stability against mold and bacterial growth.

EXAMPLE 14

A fish base was prepared comprising a mixture of equal parts of skipjack tuna, flounder and shrimp. The fish parts were thoroughly mixed together and cooked in a pressure cooker. The cooked fish was then admixed with other ingredients in amounts as follows:

| Ingredients | Parts by Weight |
|---|---|
| Fish | 90.00 |
| citric acid | 2.75 |
| Gelatinized corn flour | 3.125 |
| Animal fat (choice white grease) | 3.00 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked fish and the product cast into small particles. The product was found to have a pH of 4.50 and a water activity, $A_w$, of 0.99. The product was highly acceptable to cats and had shelf stability against mold and bacterial growth.

EXAMPLE 15

A fish base was prepared comprising a mixture of equal parts of skipjack tuna, flounder and shrimp. The fish parts were thoroughly mixed together and cooked in a pressure cooker. The cooked fish was then admixed with other ingredients in amounts as follows:

| Ingredients | Parts By Weight |
|---|---|
| Fish | 90.00 |
| Tartaric acid | 2.50 |
| Gelatinized corn flour | 3.375 |
| Animal fat (choice white grease) | 3.00 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked fish and the product cast into small particles. The product was found to have a pH of 4.68 and a water activity, $A_w$, of 0.99. The product was highly acceptable to cats and had shelf stability against mold and bacterial growth.

EXAMPLE 16

A fish base was prepared comprising a mixture of equal parts of skipjack tuna, flounder and shrimp. The fish parts were thoroughly mixed together and cooked in a pressure cooker. The cooked fish was then admixed with other ingredients in amounts as follows:

| Ingredients | Parts By Weight |
|---|---|
| Fish | 90.00 |
| Acetic acid | 2.50 |
| Gelatinized corn flour | 3.125 |
| Animal fat (choice white grease) | 3.25 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked fish and the product cast into small particles. The product was found to have a pH of 4.65 and a water activity, $A_w$, of 0.99. The product was highly acceptable to cats and had shelf stability against mold and bacterial growth.

EXAMPLE 17

A fish base was prepared comprising a mixture of equal parts of skipjack tuna, flounder and shrimp. The fish parts were thoroughly mixed together and cooked in a pressure cooker. The cooked fish was then admixed with other ingredients in amounts as follows:

| Ingredients | Parts by Weight |
|---|---|
| Fish | 90.00 |
| Hydrochloric acid | 3.50 |
| Gelatinized corn flour | 2.50 |
| Animal fat (choice white grease) | 2.625 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked fish and the product cast into small particles. The product was found to have a pH of 3.90 and a water activity, $A_w$, of 0.99. The product was highly acceptable to cats and had shelf stability against mold and bacterial growth.

EXAMPLE 18

A fish base was prepared comprising a mixture of equal parts of skipjack tuna, flounder and shrimp. The fish parts were thoroughly mixed together and cooked in a pressure cooker. The cooked fish was then admixed with other ingredients in amounts as follows:

| Ingredients | Parts by Weight |
|---|---|
| Fish | 90.00 |
| Phosphoric acid | 3.75 |
| Gelatinized corn flour | 2.625 |
| Animal fat (choice white grease) | 2.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked fish and the product cast into small particles. The product was found to have a pH of 3.75 and a water activity, $A_w$, of 0.99. The product was highly acceptable to cats and had shelf stability against mold and bacterial growth.

EXAMPLE 19

Skipjack tuna was ground and cooked in a pressure cooker. The cooked fish was then admixed with other ingredients in amounts as follows:

| Ingredients | Parts by Weight |
|---|---|
| Skipjack tuna | 90.00 |
| Adipic acid | 2.75 |
| Gelatinized corn flour | 3.025 |

-continued

| Ingredients | Parts by Weight |
|---|---|
| Animal fat (choice white grease) | 2.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked fish and the product cast into small particles. The product was found to have a pH of 5.01 and a water activity, $A_w$, of 0.99. The product was highly acceptable to cats and had shelf stability against mold and bacterial growth. This product had a moisture content of about 59 percent by weight.

EXAMPLE 20

Skipjack tuna was ground and cooked in a pressure cooker. The cooked fish was then admixed with other ingredients in amounts as follows:

| Ingredients | Parts by Weight |
|---|---|
| Skipjack tuna | 90.00 |
| Succinic acid | 2.85 |
| Gelatinized corn flour | 3.625 |
| Animal fat (choice white grease) | 2.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked fish and the product cast into small particles. The product was found to have a pH of 4.25 and a water activity, $A_w$, of 0.99+. The product was highly acceptable to cats and had shelf stability against mold and bacterial growth.

EXAMPLE 21

Skipjack tuna was ground and cooked in a pressure cooker. The cooked fish was then admixed with other ingredients in amounts as follows:

| Ingredients | Parts by Weight |
|---|---|
| Skipjack tuna | 90.00 |
| Fumaric acid | 2.75 |
| Gelatinized corn flour | 3.625 |
| Animal fat (choice white grease) | 2.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked fish and the product cast into small particles. The product was found to have a pH of 4.25 and a water activity, $A_w$, of 0.98. The product was highly acceptable to cats and had shelf stability against mold and bacterial growth.

EXAMPLE 22

Skipjack tuna was ground and cooked in a pressure cooker. The cooked fish was then admixed with other ingredients in amounts as follows:

| Ingredients | Parts by Weight |
|---|---|
| Skipjack tuna | 90.00 |
| Malic acid | 2.75 |
| Gelatinized corn flour | 3.625 |
| Animal fat (choice white grease) | 2.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked fish and the product cast into small particles. The product was found to have a pH of 4.22 and a water activity, $A_w$, of about 0.99. The product was highly acceptable to cats and had shelf stability against mold and bacterial growth. This product had a moisture content of about 59 percent by weight.

EXAMPLE 23

Skipjack tuna was ground and cooked in a pressure cooker. The cooked fish was then admixed with other ingredients in amounts as follows:

| Ingredients | Parts by Weight |
|---|---|
| Skipjack tuna | 90.00 |
| Citric acid | 3.0 |
| Gelatinized corn flour | 3.375 |
| Animal fat (choice white grease) | 2.75 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked fish and the product cast into small particles. The product was found to have a pH of 4.05 and a water content of about 59 percent by weight. The product was highly acceptable to cats and had shelf stability against mold and bacterial growth.

EXAMPLE 24

Skipjack tuna was ground and cooked in a pressure cooker. The cooked fish was then admixed with other ingredients in the amount as follows:

| Ingredients | Parts by Weight |
|---|---|
| Fish | 90.00 |
| Tartaric acid | 2.75 |
| Gelatinized corn flour | 3.375 |
| Animal fat (choice white grease) | 3.00 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked fish and the product cast into small particles. The product was found to have a pH of 4.30 and a water content of about 59 percent by weight. The product was highly acceptable to cats and had shelf stability against mold and bacterial growth.

EXAMPLE 25

Skipjack tuna was ground and cooked in a pressure cooker. The cooked fish was then admixed with other ingredients in the amounts as follows:

| Ingredients | Parts by Weight |
| --- | --- |
| Fish | 90.00 |
| Acetic acid | 2.50 |
| Gelatinized corn flour | 3.375 |
| Animal fat (choice white grease) | 3.00 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked fish and the product cast into small particles. The product was found to have a pH of 4.84 and a water activity, $A_w$, of about 0.97. The product was highly acceptable to cats and had shelf stability against mold and bacterial growth.

EXAMPLE 26

Skipjack tuna was ground and cooked in a pressure cooker. The cooked fish was then admixed with other ingredients in the amounts as follows:

| Ingredients | Parts by Weight |
| --- | --- |
| Fish | 90.00 |
| Hydrochloric acid | 3.50 |
| Gelatinized corn flour | 2.75 |
| Animal fat (choice white grease) | 2.625 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked fish and the product cast into small particles. The product was found to have a pH of 3.90 and a water content of about 59 percent by weight. The product was highly acceptable to cats and had shelf stability against mold and bacterial growth.

EXAMPLE 27

Skipjack tuna was ground and cooked in a pressure cooker. The cooked fish was then admixed with other ingredients in amounts as follows:

| Ingredients | Parts by Weight |
| --- | --- |
| Fish | 90.00 |
| Phosphoric acid | 3.75 |
| Gelatinized corn flour | 2.625 |
| Animal fat (choice white grease) | 2.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked fish and the product cast into small particles. The product was found to have a pH of 3.97 and a water content of about 59 percent by weight. The product was highly acceptable to cats and had shelf stability against mold and bacterial growth.

EXAMPLE 28

A fish material was prepared by grinding and cooking flounder. The cooked flounder was admixed with other ingredients to give the following composition:

| Ingredients | Parts by Weight |
| --- | --- |
| Flounder | 90.00 |
| Adipic acid | 2.00 |
| Gelatinized corn flour | 3.175 |
| Animal fat (choice white grease) | 3.70 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked flounder and the product cast into small particles. The product had a pH of 4.87, a moisture content of about 56 percent by weight and was shelf stable. The product was highly acceptable and nutritious to cats.

EXAMPLE 29

A fish material was prepared by grinding and cooking flounder. The cooked flounder was admixed with other ingredients to give the following compositions:

| Ingredients | Parts by Weight |
| --- | --- |
| Flounder | 90.00 |
| Succinic acid | 3.25 |
| Gelatinized corn flour | 3.125 |
| Animal fat (choice white grease) | 3.50 |
| Ethoxyquin | 0.20 |
| Emulsifier (Atmos 300) | 0.50 |
| Sodium benzoate | 0.10 |
| Calcium propionate | 0.275 |
| Additional antioxidant (Tenox 6) | 0.05 |

The ingredients were admixed with the cooked flounder and the product cast into small particles. The product had a pH of 4.56, a moisture content of about 56 percent by weight and was shelf stable. The product was highly acceptable and nutritious to cats.

EXAMPLE 30

A fish material was prepared by grinding and cooking flounder. The cooker flounder was admixed with other ingredients to give the following composition:

| Ingredients | Parts by Weight |
| --- | --- |
| Flounder | 90.00 |
| Fumeric acid | 2.00 |

| Ingredients | Parts by Weight |
|---|---|
| Gelatinized corn flour | 3.375 |
| Animal fat (choice white grease) | 3.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked flounder and the product cast into small particles. The product has a pH of 4.22, a moisture content of about 56 percent by weight and was shelf stable. The product was highly acceptable and nutritious to cats.

EXAMPLE 31

A fish material was prepared by grinding and cooking flounder. The cooked flounder was admixed with other ingredients to give the following composition:

| Ingredients | Parts by Weight |
|---|---|
| Flounder | 90.00 |
| Malic acid | 2.25 |
| Gelatinized corn flour | 3.125 |
| Animal fat (choice white grease) | 3.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked flounder and the product cast into small particles. The product had a pH of 4.29, a moisture content of about 56 percent by weight and was shaft stable. The product was highly acceptable and nutritious to cats.

EXAMPLE 32

A fish material was prepared by grinding and cooking flounder. The cooked flounder was admixed with other ingredients to give the following composition:

| Ingredients | Parts by Weight |
|---|---|
| Flounder | 90.00 |
| Tartaric acid | 2.50 |
| Gelatinized corn flour | 3.075 |
| Animal fat (choice white grease) | 3.30 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked flounder and the product cast into small particles. The product had a pH of 4.34, a moisture content of about 56 percent by weight and was shelf stable. The product was highly acceptable and nutritious to cats.

EXAMPLE 33

A fish material was prepared by grinding and cooking flounder. The cooked flounder was admixed with other ingredients to give the following composition:

| Ingredients | Parts by Weight |
|---|---|
| Flounder | 90.00 |
| Acetic acid | 1.75 |
| gelatinized corn flour | 3.45 |
| Animal fat (choice white grease) | 3.675 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked flounder and the product cast into small particles. The product had a pH of 4.43, a moisture content of about 56 percent by weight and was shelf stable. The product was highly acceptable and nutritious to cats.

EXAMPLE 34

A fish material was prepared by grinding and cooking flounder. The cooked flounder was admixed with other ingredients to give the following composition:

| Ingredients | Parts by Weight |
|---|---|
| Flounder | 90.00 |
| Hydrochloric acid | 2.10 |
| Gelatinized corn flour | 2.275 |
| Animal fat (choice white grease) | 3.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked flounder and the product cast into small particles. The product had a pH of 4.29, a moisture content of about 56 percent by weight and was shelf stable. The product was highly acceptable and nutritious to cats.

EXAMPLE 35

A fish material was prepared by grinding and cooking founder. The cooked flounder was admixed with other ingredients to give the following composition:

| Ingredients | Parts by Weight |
|---|---|
| Flounder | 90.00 |
| Phosphoric acid | 2.15 |
| Gelatinized corn flour | 3.225 |
| Animal fat (choice white grease) | 3.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the cooked flounder and the product cast into small particles. The product has a pH of 4.21, a moisture content of about 56 percent by weight and was shelf stable. The product was highly acceptable and nutritious to cats.

EXAMPLE 36

Approximate equal parts of chicken necks and backs were ground and cooked in a pressure cooker. The cooked chicken was admixed with other ingredients in the following proportions:

| Ingredients | Parts by Weight |
|---|---|
| Chicken parts | 90.00 |
| Adipic acid | 2.0 |
| Gelatinized corn flour | 3.175 |
| Animal fat (choice white grease) | 3.70 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the precooked chicken parts and the product cast into small particles. The product had a pH of 4.82 and a water activity, $A_w$, of about 0.97. The product had a moisture content of about 57 percent by weight. The product was a highly acceptable chicken flavored animal food product and was shelf stable against mold and bacterial degradation.

EXAMPLE 37

Approximate equal parts of chicken necks and backs were ground and cooked in a pressure cooker. The cooked chicken was admixed with other ingredients in the following proportions:

| Ingredients | Parts by Weight |
|---|---|
| Chicken parts | 90.00 |
| Succinic acid | 2.25 |
| Gelatinized corn flour | 3.125 |
| Animal fat (choice white grease) | 3.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the precooked chicken parts and the product cast into small particles. The product had a pH of 4.28 and a water activity, $A_w$, of about 0.994. The product had a moisture content of about 56 percent by weight. The product was a highly acceptable chicken flavored animal food product and was shelf stable against mold and bacterial degradation.

EXAMPLE 38

Approximate equal parts of chicken necks and backs were ground and cooked in a pressure cooker. The cooked chicken was admixed with other ingredients in the following proportions:

| Ingredients | Parts by Weight |
|---|---|
| Chicken parts | 90.00 |
| Adipic acid | 2.0 |
| Gelatinized corn flour | 3.375 |
| Animal fat (choice white grease) | 3.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the precooked chicken parts and the product cast into small particles. The product had a pH of 4.02 and a water activity, $A_w$, of about 0.98. The product had a moisture content of about 56 percent by weight. The product was a highly acceptable chicken flavored animal food product and was shelf stable against mold and bacterial degradation.

EXAMPLE 39

Approximate equal parts of chicken necks and backs were ground and cooked in a pressure cooker. The cooked chicken was admixed with other ingredients in the following proportions:

| Ingredients | Parts by Weight |
|---|---|
| Chicken parts | 90.00 |
| Malic acid | 2.25 |
| Gelatinized corn flour | 3.075 |
| Animal fat (choice white grease) | 3.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the precooked chicken parts and the product cast into small particles. The product had a pH of 4.0 and a water activity, $A_w$, of about 0.99. The product had a moisture content of about 56 percent by weight. The product was a highly acceptable chicken flavored animal food product and was shelf stable against mold and bacterial degradation.

EXAMPLE 40

Approximate equal parts of chicken necks and backs were ground and cooked in a pressure cooker. The cooked chicken was admixed with other ingredients in the following proportions:

| Ingredients | Parts by Weight |
|---|---|
| Chicken parts | 90.00 |
| Citric acid | 2.50 |
| Gelatinized corn flour | 3.075 |
| Animal fat (choice white grease) | 3.30 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the precooked chicken parts and the product cast into small particles. The product had a pH of 3.87 and a water activity, $A_w$, of about 0.99. The product had a moisture content of about 57 percent by weight. The product was a highly acceptable chicken flavored animal food product and was shelf stable against mold and bacterial degradation.

EXAMPLE 41

Approximate equal parts of chicken necks and backs were ground and cooked in a pressure cooker. The cooked chicken was admixed with other ingredients in the following properties:

| Ingredients | Parts by Weight |
|---|---|
| Chicken parts | 90.00 |
| Tartaric acid | 2.50 |
| Gelatinized corn flour | 3.45 |

-continued

| Ingredients | Parts by Weight |
|---|---|
| Animal fat (choice white grease) | 3.30 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the precooked chicken parts and the product cast into small particles. The product had a pH of 3.52 and a water activity, $A_w$, of about 0.99. The product had a moisture content of about 57 percent by weight. The product was a highly acceptable chicken flavored animal food product and was shelf stable against mold and bacterial degradation.

EXAMPLE 42

Approximate equal parts of chicken necks and backs were ground and cooked in a pressure cooker. The cooked chicken was admixed with other ingredients in the following proportions:

| Ingredients | Parts by Weight |
|---|---|
| Chicken parts | 90.00 |
| Acetic acid | 1.75 |
| Gelatinized corn flour | 3.275 |
| Animal fat (choice white grease) | 3.675 |
| Emulsifier (Atmos 300) | 0.50 |
| Ethoxyquin | 0.20 |
| Sodium Benzoate | 0.10 |
| Calcium propionate | 0.275 |
| Additional antioxidant (Tenox 6) | 0.05 |

The ingredients were admixed with the precooked chicken parts and the product cast into small particles. The product had a pH of 5.17 and a water activity, $A_w$, of about 0.59. The product had a moisture content of about 56.0 percent by weight. The product was a highly acceptable chicken flavored animal food product and was shelf stable against mold and bacterial degradation.

EXAMPLE 43

Approximate equal parts of chicken necks and backs were ground and cooked in a pressure cooker. The cooked chicken was admixed with other ingredients in the following proportions:

| Ingredients | Parts by Weight |
|---|---|
| Chicken parts | 90.00 |
| Hydrochloric acid | 2.10 |
| Gelatinized corn flour | 3.275 |
| Animal fat (choice white grease) | 3.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the precooked chicken parts and the product cast into small particles. The product had a pH of 3.76 and a water activity, $A_w$, of about 0.99. The product had a moisture content of about 56 percent by weight. The product was a highly acceptable chicken flavored animal food product and was shelf stable against mold and bacterial degradation.

EXAMPLE 44

Approximate equal parts of chicken necks and backs were ground and cooked in a pressure cooker. The cooked chicken was admixed with other ingredients in the following proportions:

| Ingredients | Parts by Weight |
|---|---|
| Chicken parts | 90.00 |
| Phosphoric acid | 2.15 |
| Gelatinized corn flour | 3.225 |
| Animal fat (choice white grease) | 3.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The ingredients were admixed with the precooked chicken parts and the product cast into small particles. The product had a pH of 2.67 and a water activity, $A_w$, of about 0.99. The product had a moisture content of about 56 percent by weight. The product was a highly acceptable chicken flavored animal food product and was shelf stable against mold and bacterial degradation.

EXAMPLE 45

Pork liver was ground and cooked in a pressure cooker. The cooked liver was admixed with other ingredients in the following proportions:

| Ingredients | Parts by Weight |
|---|---|
| Liver | 96.90 |
| Adipic acid | 2.00 |
| Emulsifier (Atmos 300) | 0.50 |
| Ethoxyquin | 0.20 |
| Sodium benzoate | 0.10 |
| Calcium propionate | 0.25 |
| Additional Antioxidant (Tenox 6) | 0.05 |

The ingredients were admixed with the precooked liver and the product cast into small particles. The product had a pH of 4.44 and a moisture content of 68 percent by weight. The product was a highly acceptable liver-like animal food product and was shelf stable against mold and bacterial degradation.

EXAMPLE 46

Pork liver was ground and cooked in a pressure cooker. The cooked liver was admixed with other ingredients in the following proportions:

| Ingredients | Parts by Weight |
|---|---|
| Liver | 96.90 |
| Phosphoric acid | 2.00 |
| Emulsifier (Atmos 300) | 0.50 |
| Ethoxyquin | 0.20 |
| Sodium benzoate | 0.10 |
| Calcium propionate | 0.25 |
| Additional antioxidant (Tenox 6) | 0.05 |

The ingredients were admixed with the precooked liver and the product cast into small particles. The product had a pH of 3.59 and a moisture content of 68 percent by weight. The product was a highly acceptable liver-like animal food product and was shelf stable against mold and bacterial degradation.

EXAMPLE 47

Pork liver was ground and cooked in a pressure cooker. The cooked liver was admixed with other ingredients in the following proportions:

| Ingredients | Parts by Weight |
| --- | --- |
| Liver | 96.90 |
| Fumaric acid | 2.00 |
| Emulsifier (Atmos 300) | 0.50 |
| Ethyoxquin | 0.20 |
| Sodium benzoate | 0.10 |
| Calcium propionate | 0.25 |
| Additional antioxidant (Tenox 6) | 0.05 |

The ingredients were admixed with the precooked liver and the product cast into small particles. The product had a pH of 3.87 and a moisture content of 68 percent by weight. The product was a highly acceptable liver-like animal food product and was shelf stable against mold and bacterial degradation.

EXAMPLE 48

Example 1 was repeated except the animal fat was lard. The product had the same moisture, water activity, and pH and was an acceptable shelf stable human food.

EXAMPLE 49

Example 2 was repeated except the animal fat was lard. The product had the same moisture, water activity, and pH and was an acceptable shelf stable human food.

EXAMPLE 50

Example 3 was repeated except the animal fat was lard. The product had the same moisture, water activity, and pH and was an acceptable shelf stable human food.

EXAMPLE 51

Example 4 was repeated except the animal fat was lard. The product had the same moisture, water activity, and pH and was an acceptable shelf stable human food.

EXAMPLE 52

Example 8 was repeated except the animal fat was lard. The product had the same moisture, water activity, and pH and was an acceptable shelf stable human food.

EXAMPLE 53

Example 10 was repeated except the animal fat was lard. The product had the same moisture, water activity, and pH and was an acceptable shelf stable human food.

EXAMPLE 54

Example 11 was repeated except the animal fat was lard. The product had the same moisture, water activity, and pH and was an acceptable shelf stable human food.

EXAMPLE 55

Example 24 was repeated except the animal fat was lard. The product had the moisture, water activity, and pH and was an acceptable shelf stable human food.

EXAMPLE 56

Example 30 was repeated except the animal fat was lard. The product had the same moisture, water activity, and pH and was an acceptable shelf stable human food.

EXAMPLE 57

Example 34 was repeated except the animal fat was lard. The product had the same moisture, water activity, and pH and was an acceptable shelf stable human food.

While the many examples hereinbefore illustrated do not show the complete range of all ingredients, highly acceptable foods still result when the amount of ingredients are altered to give various textures providing the specified ranges are adhered to.

The previous examples illustrate various high protein meaty material containing products. Any of the above examples may readily produce a highly nutritious and shelf stable food product simply by replacing a portion of the proteinaceous meaty material with a starchy filler material, but maintaining the proteinaceous meaty material in an amount greater than 50 percent by weight of the product.

The new product may be cast as individual particles, may be put in a sausage casing or other such thing, or may be cast in something like a toothpaste like tube and thereafter squeezed out to resemple a pate. In each case the food product produced herein is highly nutritious and shelf stable.

The products relating to the use of 90 percent by weight pork liver with adipic acid constitute the preferred embodiment of this invention, although the other embodiments listed in the examples are also highly acceptable.

Having fully described this new and unique invention, I claim:

1. A shelf stable, high moisture containing, food product having a moisture content of at least about 50 percent by weight and having a water activity, $A_w$, of at least about 0.90, said food product comprising greater than 50 percent by weight ground, cooked, proteinaceous, meaty material; from about 1 percent to about 35 percent by weight gelatinized starchy filler material with the total amount of cooked, proteinaceous, meaty material plus starchy filler material comprising greater than about 85 percent by weight of the food; from about 1.7 percent to about 3.8 percent by weight edible, non-toxic acid sufficient to cause the food product to have a pH of from about 3.9 to about 5.5; and an effective amount of antimycotic.

2. A product as in claim 1 which includes an effective amount of antioxidant.

3. A shelf stable, high moisture containing food product as in claim 1 which also includes from about 2 to 4 percent by weight edible fat or oil.

4. A shelf stable, high moisture containing food product as in claim 1 which also includes from about 0.1 to 3 percent by weight emulsifier.

5. A shelf stable, high moisture containing food product as in claim 1 which also includes from about 2 to 4 percent by weight edible fat or oil and from about 0.1 to 3 percent by weight emulsifier.

6. A shelf stable, high moisture containing, food product having a water content of at least about 50 percent by weight and having a water activity, $A_w$, of at least about 0.90, said food product comprising greater than about 90 percent by weight ground, cooked, proteinaceous, meaty material, from 1 percent to 5 percent by weight gelatinized starchy material, from about 1.7 percent to about 3.8 percent by weight edible, non-toxic acid sufficient to cause the food product to have a pH of from about 3.9 to about 5.5, and an effective amount of antimycotic.

7. A product as in claim 6 which also includes an effective amount of antioxidant.

8. A shelf stable, high moisture containing food product as in claim 6 which also includes from about 2 to about 4 percent by weight edible fat or oil.

9. A shelf stable, high moisture containing food product as in claim 6 which also includes from about 0.1 to 3 percent by weight emulsifier.

10. A shelf stable, high moisture containing food product such as in claim 6 which also includes from about 2 to 4 percent by weight edible fat or oil and from about 0.1 to 3 percent by weight emulsifier.

11. A shelf stable, high moisture containing, food product having a moisture content at least about 50 percent by weight and having a water activity, $A_w$, of at least about 0.90, said food product comprising about 90 percent by weight ground, cooked pork or beef liver, about 4 percent by weight edible fat or oil, about 3 percent by weight gelatinized starch, about 2 percent by weight edible acid, and an effective amount of antioxidant and antimycotic.

12. A food product as in claim 11 which also includes about 0.5 percent emulsifier.

13. A shelf stable, high moisture containing, food product having a water content of at least about 50 percent by weight and having a water activity, $A_w$, of at least about 0.90, said food product comprising from 85 to 95 percent by weight of a ground, cooked pork or beef liver, from 1–6 percent by weight edible fat or oil, from 2–5 percent by weight gelatinized starch material, from about 1.7 to 3.8 percent by weight edible non-toxic acid in order to provide a pH of from about 3.9 to 5.5, and an effective amount of antioxidant and antimycotic.

14. A shelf stable, high moisture containing, food product having a moisture content of at least about 50 percent by weight and having a water activity, $A_w$, of at least about 0.90, said food product comprising from about 85 percent to 95 percent by weight ground, cooked chicken parts, from about 1 to 6 percent by weight edible fat or oil, from about 2 to 6 percent by weight gelatinized starch material, from about 1.7 to 3.8 percent by weight edible non-toxic acid in order to give a pH of from about 3.9 to 5.5, and an effective amount of antioxidant and antimycotic.

15. A food product as in claim 14 which also includes from about 0.1 to 3 percent by weight emulsifier.

16. A shelf stable, high moisture, food product having a moisture content of at least about 50 percent by weight and a water activity, $A_w$, of at least about 0.90, said food product comprising from about 85 to 95 percent by weight ground, cooked fish, from about 1 to 6 percent by weight edible fat or oil, from about 2 to 5 percent by weight gelatinized starch materials, from about 1.7 to 3.8 percent by weight edible non-toxic acid in order to provide a pH of from about 3.9 to 5.5, and an effective amount of antioxidant and antimycotic.

17. A shelf stable, high moisture containing food product such as in claim 16 which also includes from about 0.1 to 3 percent by weight emulsifier.

18. A process for producing a shelf stable, high moisture containing, food product, having a moisture content of at least about 50 percent and a water activity of at least about 0.90 said process comprising: grinding a proteinaceous, meaty material; cooking the proteinaceous, meaty material; admixing the meaty material with a starchy filler material, an edible non-toxic acid, and an effective amount of antimycotic, in amounts sufficient to provide at least about 50 percent by weight cooked, proteinaceous, meaty material and from about 1 percent to about 35 percent by weight gelatinized starchy filler material with the total amount of cooked, proteinaceous meaty material plus starch filler material comprising greater than about 85 percent by weight of the food product, from about 1.7 percent to about 3.8 percent by weight edible non-toxic acid sufficient to cause the food product to have a pH of from about 3.9 to about 5.5; and thereafter forming the mixture into the shape of a food product.

19. A process for producing a shelf stable, high moisture, food product having a moisture content of at least about 50 percent and a water activity of at least about 0.90, said process comprising: admixing a ground proteinaceous, meaty material with a starchy filler material, an edible non-toxic acid, and an effective amount of antimycotic in amounts sufficient to provide at least about 50 percent by weight proteinaceous, meaty material and from about 1 percent to about 35 percent by weight gelatinized starchy filler material with the total amount of proteinaceous, meaty material plus starchy filler material comprising greater than about 85 percent by weight of the food product, from about 1.7 percent to about 3.8 percent by weight edible non-toxic acid sufficient to cause the food product to have a pH of from about 3.9 to about 5.5; and thereafter cooking the mixture and forming it into the shape of a food product.

20. A process for producing a shelf stable, high moisture containing, food product having a moisture content of at least about 50 percent and a water activity of at least about 0.90, said process comprising: cooking a proteinaceous, meaty material; grinding the proteinaceous meaty material, admixing the cooked meaty material with a gelatinized starchy filler, an edible non-toxic acid, and an effective amount of antioxidant and antimycotic in amounts sufficient to provide at least about 90 percent by weight cooked, proteinaceous, meaty material, from about 1 percent to about 5 percent by weight gelatinized starchy filler material, and from about 1.7 percent to about 3.8 percent by weight edible non-toxic acid sufficient to cause the food product to have a pH of from about 3.9 to 5.5; and thereafter forming the mixture into the shape of a food product.

21. A process as in claim 20 which also includes admixing from about 2 to 4 percent by weight edible fat or oil with the other ingredients.

22. A process as in claim 20 which also includes admixing from about 0.1 to about 3 percent by weight emulsifier with the other ingredients.

23. A process as in claim 20 which also includes admixing from about 2 percent to 4 percent by weight edible fat or oil and from about 0.1 to 3 percent by weight emulsifier with the other ingredients.

24. A process for producing a shelf stable, high moisture containing, food product, having a moisture content of at least about 50 percent and a water activity of at least about 0.90 said process comprising: cooking pork or beef liver; grinding the liver; admixing the liver with a gelatinized starchy material, an edible non-toxic acid, and an effective amount of antioxidant and antimycotic in amounts sufficient to provide from about 85 to 95 percent by weight cooked pork or beef liver, from 0–6 percent by weight edible fat or oil, from about 2–5 percent by weight gelatinized starchy material, and from about 1.7 to 3.8 percent by weight edible non-toxic acid in order to provide a pH of from about 3.9 to 5.5; and thereafter forming the mixture into the shape of a food product.

25. A process for producing a shelf stable, high moisture containing, food product having a moisture content of at least about 50 percent and a water activity of at least about 0.90, said process comprising: cooking a mixture of chicken parts; grinding the cooked chicken parts; admixing the cooked chicken parts with a gelatinized starchy filler material, an edible non-toxic acid, and an effective amount of antioxidant and antimycotic in amounts sufficient to provide from about 85–95 percent by weight cooked chicken parts, from about 2–5 percent by weight gelatinized starchy filler material, and from about 1.7 to 3.8 percent by weight edible non-toxic acid in order to provide a pH of from about 3.9 to 5.5; and thereafter forming the mixture into the shape of a food product.

26. A process for producing a shelf stable, high moisture containing, food product, having a moisture content of at least about 50 percent and a water activity of at least about 0.90 said process comprising: cooking fish, grinding the fish; admixing the cooked fish with a gelatinized starchy filler material, an edible non-toxic acid, and an effective amount of antioxidant and antimycotic in amounts sufficient to provide from about 85–95 percent by weight cooked fish, from about 2–5 percent by weight gelatinized starchy filler material, from about 1.7 to 3.8 percent by weight edible non-toxic acid in order to provide a pH of from about 3.9 to 5.5; and thereafter forming the mixture into the shape of a food product.

27. A shelf stable, high moisture, food product having a moisture content of at least about 50 percent by weight and having a water activity, $A_w$, of at least about 0.90, said food product comprising greater than 50 percent by weight ground, cooked, proteinaceous fish plus starchy filler material comprising greater than about 85 percent by weight of the food product; from about 1.7 percent to about 3.8 percent by weight edible, non-toxic acid sufficient to cause the food product to have a pH of from about 3.9 to about 5.5; and an effective amount of antimycotic.

* * * * *